US010995659B2

(12) United States Patent
Bartolome et al.

(10) Patent No.: US 10,995,659 B2
(45) Date of Patent: May 4, 2021

(54) METHOD OF OPERATING A MOTOR VEHICLE AND MOTOR VEHICLE

(71) Applicant: Volkswagen Aktiengesellschaft, Wolfsburg (DE)

(72) Inventors: Javier Bartolome, Braunschweig (DE); Manuel Vahldiek, Braunschweig (DE); Dirk Hagelstein, Braunschweig (DE); Arne Staats, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/504,063

(22) Filed: Jul. 5, 2019

(65) Prior Publication Data
US 2020/0011231 A1 Jan. 9, 2020

(30) Foreign Application Priority Data

Jul. 5, 2018 (DE) .................... 10 2018 211 095.6

(51) Int. Cl.
*F02B 37/22* (2006.01)
*F04D 27/02* (2006.01)
(Continued)

(52) U.S. Cl.
CPC ........ *F02B 37/225* (2013.01); *F04D 27/0253* (2013.01); *F04D 29/464* (2013.01); *F02D 2041/223* (2013.01)

(58) Field of Classification Search
CPC ........ F02B 37/225; F02B 37/22; F02B 37/24; F04D 27/0253; F04D 29/464; F02D 2041/223; F16K 3/03; F02M 26/06
(Continued)

(56) References Cited

U.S. PATENT DOCUMENTS 2,321,336 A * 6/1943 Tondreau ............... F16K 3/03
                                                        251/212
2,649,272 A * 8/1953 Barbato ............... F16K 3/03
                                                        251/212
(Continued)

FOREIGN PATENT DOCUMENTS

DE    102008030502 A1 *  1/2009  ......... F04D 29/4213
DE    102010026176 A1    1/2012
(Continued)

OTHER PUBLICATIONS

Korean Office Action for Korean Application No. 10-2019-0079812 dated Jun. 23, 2020—English translation.

*Primary Examiner* — Thai Ba Trieu
(74) *Attorney, Agent, or Firm* — Muncy, Geissler, Olds & Lowe, P.C.

(57) ABSTRACT

A method of operating a motor vehicle having an internal combustion engine, wherein the internal combustion engine has at least one combustion engine which is connected by a rotary drive via a transmission and optionally a clutch with powered wheels of the motor vehicle, and further comprises a fresh gas line, and wherein in the fresh gas line, a compressor is integrated, which is associated with a trim controller, by means of which an edge-side portion of the inlet cross section of a compressor impeller of the compressor is coverable to a variable extent. In this case, in a release position of the trim controller, the edge-side portion of the inlet cross section is covered relatively little, preferably the least possible, and in a covering position of the trim controller, is mostly covered, preferably as much as possible.

6 Claims, 3 Drawing Sheets

(51) Int. Cl.
*F04D 29/46* (2006.01)
*F02D 41/22* (2006.01)

(58) Field of Classification Search
USPC .............. 60/611, 605.2; 701/103–104, 108; 251/212; 415/166, 208.3
See application file for complete search history.

(56) References Cited

U.S. PATENT DOCUMENTS

| | | | | |
|---|---|---|---|---|
| 3,159,179 | A * | 12/1964 | De Lain | F16K 3/03 251/212 |
| 3,396,904 | A * | 8/1968 | Janette | F04D 29/4213 251/212 |
| 4,094,492 | A * | 6/1978 | Beeman | F16K 3/03 251/212 |
| 4,173,121 | A * | 11/1979 | Yu | F02C 6/14 60/791 |
| 4,270,344 | A * | 6/1981 | Yu | F02C 6/14 60/791 |
| 4,589,302 | A * | 5/1986 | Oda | B60W 30/1819 477/107 |
| 4,719,758 | A * | 1/1988 | Sumser | F04D 29/464 60/611 |
| 5,025,629 | A * | 6/1991 | Woollenweber | F02B 37/24 60/611 |
| 6,394,751 | B1 * | 5/2002 | Daudel | F04D 27/0207 415/208.3 |
| 6,554,568 | B2 * | 4/2003 | Fledersbacher | F01D 17/141 415/166 |
| 6,609,056 | B1 * | 8/2003 | Czarnecki | B60K 31/04 701/51 |
| 7,819,728 | B2 * | 10/2010 | Beckley | B60H 1/3407 454/155 |
| 9,005,080 | B1 * | 4/2015 | Tokura | B60W 10/06 477/33 |
| 9,777,640 | B2 | 10/2017 | Mohtar et al. | |
| 2005/0257520 | A1 | 11/2005 | Fischle et al. | |
| 2014/0377051 | A1 * | 12/2014 | Sun | F04D 29/464 415/157 |
| 2016/0131145 | A1 * | 5/2016 | Mohtar | F02B 37/22 417/380 |
| 2016/0230650 | A1 * | 8/2016 | Mohtar | F02B 37/24 |
| 2016/0353951 | A1 * | 12/2016 | Buchanan | F04D 29/422 |
| 2018/0094647 | A1 | 4/2018 | Puzik et al. | |
| 2018/0202559 | A1 * | 7/2018 | Freeman, III | F16K 3/03 |
| 2019/0048876 | A1 * | 2/2019 | Mohtar | F02B 37/22 |
| 2019/0078586 | A1 * | 3/2019 | Zeng | F02B 37/24 |
| 2019/0218981 | A1 * | 7/2019 | Styles | F02B 37/225 |
| 2019/0264710 | A1 * | 8/2019 | Mohtar | F02B 37/24 |
| 2019/0368373 | A1 * | 12/2019 | Hu | F02B 37/24 |
| 2019/0368374 | A1 * | 12/2019 | Hu | F02B 37/24 |
| 2020/0208568 | A1 * | 7/2020 | Bogner | F04D 29/464 |
| 2020/0208570 | A1 * | 7/2020 | Bogner | F04D 29/464 |
| 2020/0208651 | A1 * | 7/2020 | Bogner | F04D 29/464 |
| 2020/0208652 | A1 * | 7/2020 | Bogner | F04D 29/464 |
| 2020/0217241 | A1 * | 7/2020 | Bogner | F04D 29/464 |

FOREIGN PATENT DOCUMENTS

| | | |
|---|---|---|
| DE | 102012011423 B3 | 11/2013 |
| DE | 102014225716 A1 | 7/2015 |
| DE | 102015209704 A1 | 8/2016 |
| DE | 10 2015 203 551 | 9/2016 |
| DE | 102015209666 A1 | 12/2016 |
| DE | 10 2017 005 412 A1 | 12/2017 |
| DE | 102017209598 A1 | 5/2018 |
| EP | 3018355 A1 | 5/2016 |
| EP | 3 176 440 A1 | 6/2017 |
| EP | 3 543 538 A1 | 9/2019 |
| JP | 2013-217318 A | 10/2013 |
| JP | 2017-020514 A | 1/2017 |
| WO | WO 01/55575 A1 | 8/2001 |
| WO | WO2004022956 A1 | 3/2004 |
| WO | WO 2013/074503 A1 | 5/2013 |
| WO | WO2014131790 A1 | 9/2014 |

* cited by examiner

METHOD OF OPERATING A MOTOR VEHICLE AND MOTOR VEHICLE

This nonprovisional application claims priority under 35 U.S.C. § 119(a) to German Patent Application No. 10 2018 211 095.6, which was filed in Germany on Jul. 5, 2018, and which is herein incorporated by reference.

BACKGROUND OF THE INVENTION

Field of the Invention

The present invention relates to a method for operating a motor vehicle having an internal combustion engine and to a motor vehicle suitable for carrying out such a method.

Description of the Background Art

In a compressor of an internal combustion engine for a motor vehicle, the fresh gas to be supplied to the combustion engine of the internal combustion engine is compressed via a fresh gas line. In this case, the increase in pressure of the fresh gas is dependent on the rotational speed of the compressor impeller as well as on the mass flow of the fresh gas guided through the compressor impeller. In the direction of the so-called surge line of the compressor map, the inflow of the inlet edges of the impeller blades takes place increasingly on the pressure side as a result of the flow velocity decreasing relative to the peripheral speed, i.e., the incidence of the inflow increases steadily. From an operating point-dependent limit value of the incidence, the so-called surge line, the inflow at the inlet edges separates and the flow in the compressor becomes unstable. In the area of the surge line, a recirculation zone of low-impulse fluid forms on the inlet side housing contour of the compressor. This so-called recirculation bubble leads to a drop in compressor efficiency due to swirling and mixing losses. In the region of the hub contour of the impeller, however, an high-impulse and low-loss core flow runs through the compressor close to the surge line, which determines the mass flow rate and the pressure build-up.

A trim controller as is known, for example, from DE 10 2010 026 176 A1, EP 3 018 355 A1 (which corresponds to U.S. Pat. No. 9,777,640), DE 10 2015 209 704 A1, DE 10 2014 225 716 A1 or WO 2014/131790 A1, is used for the displacement of the surge line of a compressor map in the direction of relatively low mass flows at relatively high pressure conditions. At the same time, a trim controller can cause an increase in compressor efficiency in the surge line area. For this purpose, a trim controller comprises a device by means of which the inflow cross section, in which the impeller of the compressor is supplied air, can be changed. By means of the thus achieved nozzle action of the trim controller, with increasing control intervention (reduction of the inflow cross section), the gas flow can be focused more on the inlet cross section of the compressor impeller close to the hub. As a result, less gas flows into the low-impulse region of the recirculation bubble that is subject to loss, and the core flow in the region close to the hub is accelerated and additionally stabilized thereby. The acceleration of the gas flow in the hub-proximal region of the compressor impeller additionally results in displacement of the inflow on the compressor impeller, which may contribute to further stabilization of the core flow. The stabilization of the core flow leads to the desired displacement of the surge line of the compressor map to lower mass flows. If there is an undesired control intervention (trim collector is fully open), if possible, the entire cross section of the fresh gas line shall be released upstream of the compressor impeller so that no additional friction or throttle losses occur in the inflow on the compressor impeller present at that time. The trim controller does therefore not significantly adversely affect the compressor efficiency and the width of the compressor map in the direction of the choke line.

In the operation of an internal combustion engine of a motor vehicle, a noise development frequently referred to as "rattling" can prove problematical, which occurs during shifting operations, i.e., during a gear change, in which a manual transmission, which is integrated in the drive train between the engine of the internal combustion engine and the powered impellers/wheels, changes the output speed of the engine to the input speed of the impellers/wheels. Such a rattling occurs particularly during acceleration of the motor vehicle due to the relatively high load with which the engine is operated, and due to the shifting operations, that are customary during acceleration. The relatively high load with which the engine is operated results in a correspondingly high compressor pressure ratio (ratio of the absolute pressure on the high pressure side of the compressor to the absolute pressure on the low pressure side) with a simultaneously relatively high mass flow of fresh gas which passes through the compressor. When a relatively high compressor pressure ratio in conjunction with a relatively high fresh gas mass flow is given, as a rule the compressor is operated at a sufficient distance from the surge line. During a shifting operation, however, the fresh gas mass flow may temporarily decrease sharply while the compressor pressure ratio continues to rise, remains essentially the same, or at least only decreases relatively slightly. This may result in the compressor being temporarily operated near the surge line during the shifting process. This can lead to the formation of the recirculation bubble described above, which spreads in waves in the area of the fresh gas line, which is situated upstream of the compressor impeller, which can lead to a corresponding vibration excitation of the local components of the fresh gas line. This vibration excitation leads to the noise referred to as rattling.

WO 2004/022956 A1 discloses a method by which the operation of a compressor of an internal combustion engine is to be avoided in the region of the surge line. According to the invention, the behavior of the compressor is monitored for the characteristic vibration behavior of the fresh gas flowing through the intake port by means of an air flow sensor disposed in an intake port of the internal combustion engine. If a short-term threat of reaching the surge line is determined in this way, for example, the value for the target boost pressure to be achieved is reduced, for which purpose an exhaust gas turbine driving the compressor is supplied air in a correspondingly modified manner, which is achieved by adjusting a device for a variable turbine geometry (VTG).

SUMMARY OF THE INVENTION

It is therefore an object of the present invention to provide an internal combustion engine for a motor vehicle supercharged by a compressor, which is characterized by a performance that is as optimal as possible, particularly with respect to the acoustic behavior during shifting.

In an internal combustion engine supercharged by a compressor in which the compressor is assigned a trim controller to improve its operating performance, the invention is based on the idea of also actively using the trim controller in order to avoid or at least minimize the rattling noise that can occur in supercharged internal combustion engines during shifting.

Accordingly, a method is provided for operating a motor vehicle with an internal combustion engine, wherein the internal combustion engine comprises at least one combustion engine, which is at least temporarily connected by a rotary drive with powered wheels of the motor vehicle via a transmission and possibly a clutch, and further comprises a fresh gas line, and wherein a compressor is integrated in the fresh gas line, which is associated with a trim controller, by means of which an edge-side portion of the inlet cross section of a compressor impeller of the compressor can be covered to varying degrees. In this case, in a release position of the trim controller, the edge-side portion of the inlet cross section is covered relatively little (as compared to a covering position), preferably the least possible (i.e., as little as possible as is maximally determined by the structural design), and in the covering position of the trim controller, fairly substantially (as compared to the released position), preferably as much as possible (i.e., to such an extent as determined by the structural design to be maximally possible, wherein this maximum position was determined as optimal for a defined operation of the compressor). The invention provides that the trim controller is adjusted to the covering position for transitioning from a (in particular transient) first operating state of the internal combustion engine, in which the transmission is in a first gear ratio shift position ("gear") and the trim controller is in the released position, to a second operating state of the internal combustion engine in which the transmission is in second gear ratio shift position ("gear"). The numbering of the gear ratio shift positions merely serves the purpose of general distinction and not a distinction in respect of the gear ratio. The gear ratio of the first gear ratio shift position can therefore be greater or less than the gear ratio of the second gear ratio shift position.

According to the invention, the trim controller of the internal combustion engine is accordingly moved to the covering position when as a result of a shift at the edge of the compressor impeller, previously compressed fresh gas can be recirculated from the high pressure side to the low pressure side of the compressor. The trim controller, which then largely and preferably mostly covers the edge-side portion of the inlet cross section of the compressor impeller, prevents or at least interferes with such a recirculation or with the further propagation in the portion of the fresh gas line located upstream of the trim controller, whereby vibration excitations, which would lead to a rattling, can be prevented or minimized.

It can also be provided that the inventive adjustment of the trim controller for a shifting operation or during a shifting operation is only carried out if the adjustment improves the efficiency of the compressor or worsens it by no more than 2%.

A motor vehicle in which an automated execution of a method according to the invention can take place during operation comprises at least one internal combustion engine which has a combustion engine (in particular a (self-igniting and quality-controlled) diesel engine or a (spark-ignited and quantity-controlled) gasoline engine or a combination thereof, i.e., for example, a combustion engine with homogeneous compression ignition), which is at least temporarily connected by a rotary drive with powered wheels of the motor vehicle via a transmission and possibly a clutch, and further comprising a fresh gas line, wherein a compressor is integrated in the fresh gas line, and wherein the compressor is assigned a trim controller, by means of which an edge-side portion of the inlet cross section of a compressor impeller of the compressor can be covered to a varying extent. In this case, in a release position of the trim controller, the edge-side portion of the inlet cross section is covered relatively little, preferably as little as possible (i.e., as little as possible as is maximally determined by the structural design), and in the covering position of the trim controller, relatively substantially, as much as is determined by the structural design to be maximally possible ("optimal maximum setting"). Furthermore, such an internal combustion engine comprises a control device which is set up for the automated execution of a method according to the invention.

According to the invention, the "inlet plane" of the compressor impeller can be understood to be the plane closest to the trim controller that is oriented perpendicular to the rotational axis of the compressor impeller, which is defined by impeller blades of the compressor impeller, in that at least one punctiform portion of one, more or all of the leading edges of said impeller blades are arranged within that plane. The "inlet cross section" of the compressor impeller is the opening cross section of the flow space located in this inlet plane.

The trim controller of an internal combustion engine according to the invention can in principle be arbitrary configured, for example according to one of the embodiments as disclosed in DE 10 2010 026 176 A1, EP 3 018 355 A1, DE 10 2015 209 704 A1, DE 10 2014 225 716 A1 or WO 2014/131790 A1, which are incorporated herein by reference.

The trim controller of the internal combustion engine of a motor vehicle according to the invention comprises an annular diaphragm. The diaphragm can, for example, be designed in the form of an iris diaphragm as it is basically known from photo lenses. Alternatively, the diaphragm may also include in particular an annular stator and in particular an annular rotor, which are arranged side by side in the longitudinal axial direction, wherein both the stator and the rotor in each case form at least one through-opening, and which by rotation of the rotor relative to the stator (which can also be moved), can be moved to different relative positions, in which these do not, partially or completely overlap. A trim controller which comprises only one such diaphragm can be characterized by a relatively simple structural design.

The trim controller can additionally comprises a flow guide device, by means of which at least a portion of the fresh gas line is divided into a central flow region and a peripheral flow region, which in the area of the inlet plane of the compressor impeller both merge into a flow space of the compressor receiving the compressor impeller, wherein the peripheral flow region is closable by means of the diaphragm. The diaphragm may preferably be arranged at the upstream end of the peripheral flow region. By means of such a combination of diaphragm and flow guide device, as compared to a trim controller comprising only an annular diaphragm, the function of the trim controller can be improved both with respect to the effects on the compressor map and with respect to suppressing the rattling.

The function of such a trim controller with diaphragm and flow guide device can be even further improved when at least one end portion of the flow guide device adjacent to the compressor impeller, optionally the entire flow guide device, is designed to be longitudinally axially slidable (i.e., along the rotational axis of the compressor impeller), wherein in the region of the inlet plane of the compressor impeller, the peripheral flow region is closed by said end portion in a closed position of the flow guide device, and is released in an open position.

The trim controller can be moved back to the release position when the engine is operated in the second operating state with a load beyond a defined limit (e.g., defined by the fuel quantity introduced into the combustion chambers per work cycle or the torque generated by the engine or by the achieved boost pressure or by the achieved speed of the compressor impeller). Before carrying out such a reset of the trim controller, however, it is preferable to wait, i.e., the trim controller is left in the covering position until the risk of rattling has become sufficiently low. For this purpose, it can be provided in particular that the trim controller is only moved back to the release position as soon as the value of the mass flow of fresh gas through the compressor corresponds to the (maximum) value immediately prior to the reset and/or is at a defined (sufficient) distance from the surge line of the compressor. It is also possible to leave the trim controller in the covering position for a defined minimum period.

If, however, the engine, is operated in the second operating state with a load corresponding at most to the limit value, it is preferably provided that the trim controller is left in the covering position (as long as that condition is met).

The compressor of the internal combustion engine of a motor vehicle according to the invention can in particular be part of an exhaust gas turbocharger, further comprising an exhaust gas turbine integrated in the exhaust line. The compressor is then driven by means of the exhaust gas turbine using the exhaust gas enthalpy. Alternatively, or additionally, the compressor can also be designed to be powered in another way, for example by the combustion engine, i.e., mechanically, or by means of an electric motor.

The inventive motor vehicle can be, for example, a wheel-based, non-rail vehicle (such as a car or a truck).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
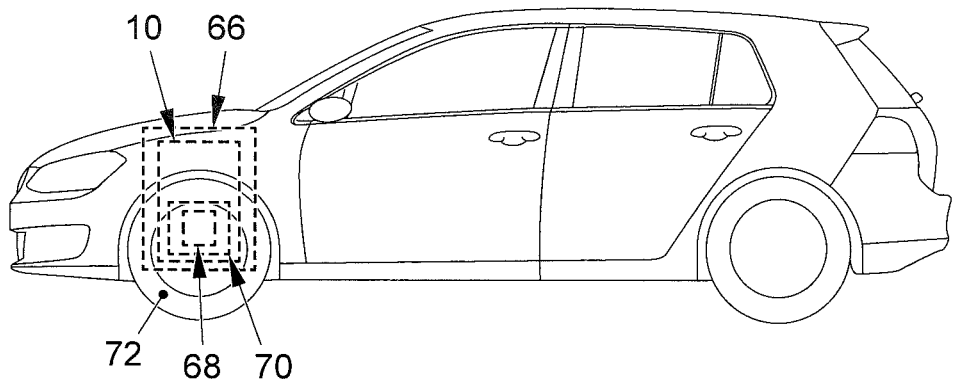
FIG. 1 illustrates a motor vehicle according to the invention.

FIG. 1 shows a simplified representation of an inventive motor vehicle with an internal combustion engine system 66 comprising an engine 10, which is connected or connectable via a rotary drive with wheels 72 of the motor vehicle via a clutch 68 and a transmission 70. The internal combustion engine system 66 may be designed, for example, according to the one shown in FIG. 2.

Figure 2:
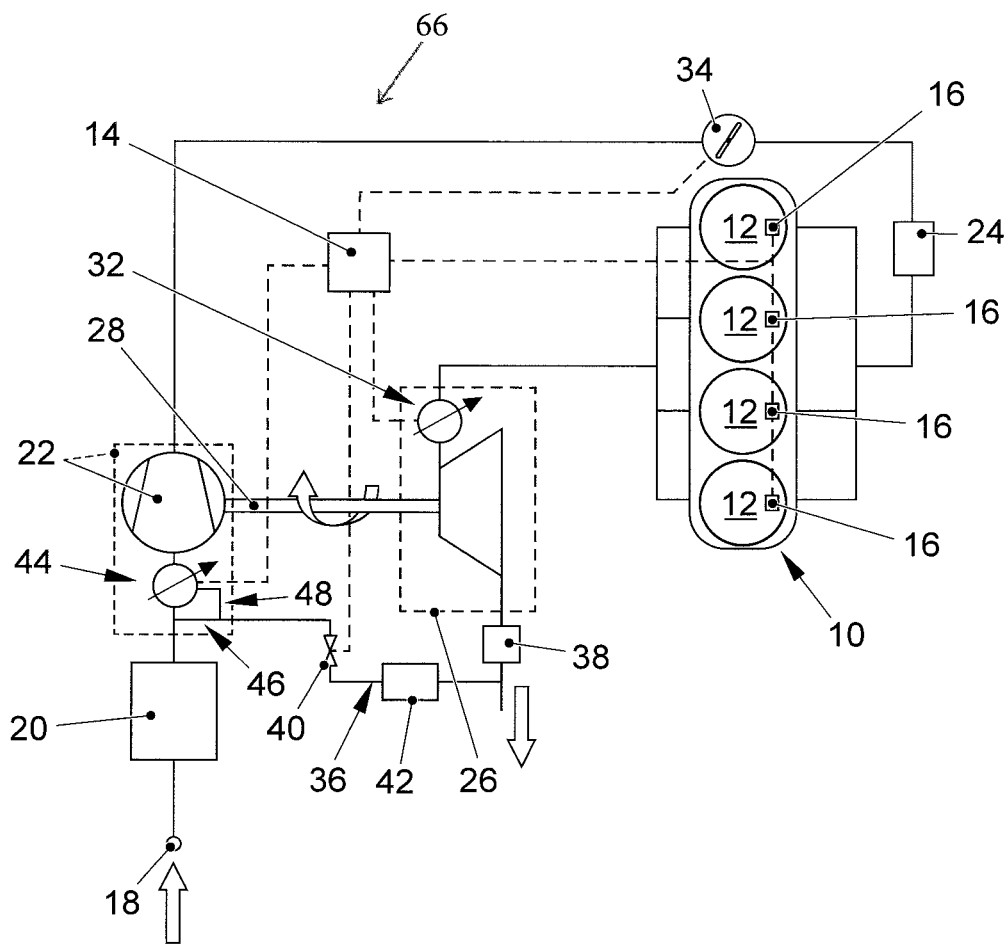
FIG. 2 illustrates an internal combustion engine for a motor vehicle according to the invention.

The engine 10 of the internal combustion engine system 66 according to FIG. 2 formed of a plurality of cylinders 12. The cylinders 12, together with pistons guided up and down therein and a cylinder head, define combustion chambers in which fresh gas is combusted together with fuel. The fuel, controlled by a control device 14 (engine control), is injected directly into the combustion chambers by means of injectors 16. The combustion of the fuel fresh gas mixture amounts leads to cyclic up and down movements of the pistons, which in turn are transferred in a known manner via connecting rods to a crankshaft, whereby the crankshaft is driven in rotation.

The fresh gas is supplied to the engine 10 via a fresh gas line and is aspirated from the environment via an intake port 18, cleaned in an air filter 20 and then fed into a compressor 22, which is part of an exhaust gas turbocharger. The fresh gas is compressed by means of the compressor 22, then cooled in a charge-air cooler 24 and finally fed to the combustion chambers. The compressor 22 is driven by means of an exhaust gas turbine 26 of the exhaust gas turbocharger, which is integrated into an exhaust line of the internal combustion engine system 66. Exhaust gas formed by the fuel fresh gas mixture amounts in the combustion chambers of the engine 10 is discharged through the exhaust line from the engine 10 and thereby flows through the exhaust gas turbine 26. This leads in a known manner to a rotating drive of a turbine impeller, which is non-rotatably connected via a shaft 28 to a compressor impeller 30 (see FIGS. 3 and 4) of the compressor 22. The rotating drive of the turbine impeller is thus transferred to the compressor impeller 30.

In order to optimally implement the enthalpy of the exhaust gas for producing compression performance by means of the exhaust gas turbocharger during operation of the engine 10 at varying loads and speeds, the exhaust gas turbine 26 of the exhaust gas turbocharger may optionally comprise a device for variable turbine geometry (VTG) 32, which is controllable by means of the control device 14. This may comprise in a known manner a plurality of guide blades, which are arranged in an inlet channel of the exhaust gas turbine 26 and which are individually rotatable, wherein these may be adjusted together by means of an adjusting device. As a function of the rotational positions of the guide blades, these more or less narrow the free flow cross section in the inlet channel of the exhaust gas turbine 26 and also influence the portion of the primary flow of the turbine impeller and the orientation of this flow.

A throttle valve 34, likewise controllable by means of the control device 14, is integrated downstream of the compressor 22 in the charge-air duct, i.e. in the portion of the fresh gas line which is located between the compressor 22 and the engine 10.

The internal combustion engine system 66 may comprise an exhaust gas recirculation line 36 to recirculate (low pressure) exhaust gas, in which the exhaust gas is branched off from a portion of the exhaust gas line, which is located downstream of the exhaust gas turbine 26 and, in particular, also downstream of an exhaust gas aftertreatment device 38, such as a particulate filter, and is introduced into a section of the fresh gas line upstream of the compressor impeller 30. The amount of exhaust gas recirculated via the exhaust gas recirculation line 36 can in this case be controlled or regulated by means of a control valve 40 which is controllable by means of the control device 14. Further, an exhaust gas cooler 42 may be integrated in the exhaust gas recirculation line 36 for cooling the exhaust gas recirculated through it.

The compressor 22 is associated with a trim controller 44 by means of which the incident flow of the compressor impeller 30 can be influenced by the fresh gas. For this purpose, the trim controller 44 or an associated actuator can be controlled by means of the control device 14. The exhaust gas recirculation line 36 may end in the fresh gas line upstream or on the side of the trim controller 44 facing away from the compressor impeller 30. An orifice downstream or in the region of the trim controller 44 (and upstream of the compressor impeller 30) is also possible.

Figure 3:
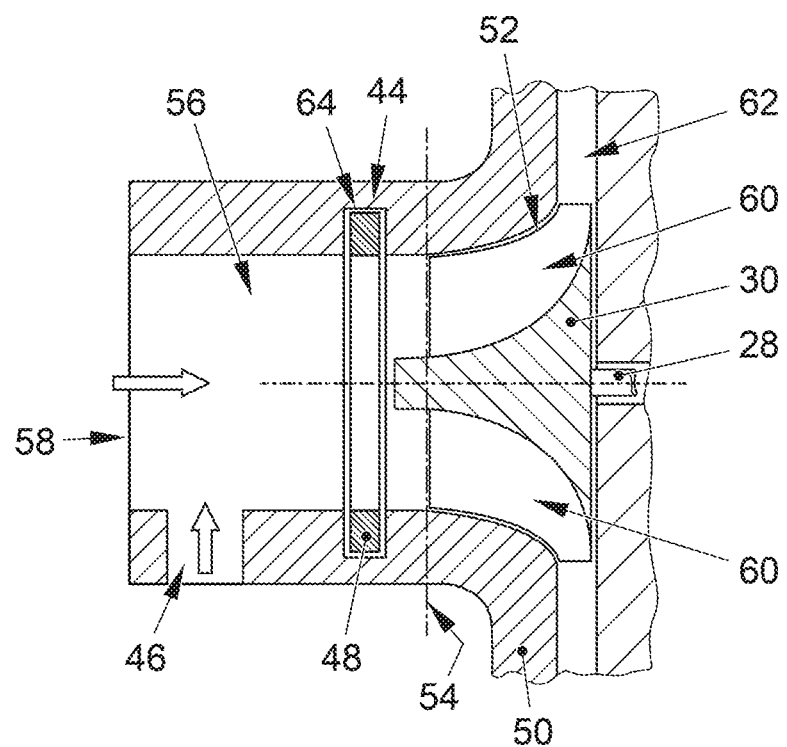
FIG. 3 illustrates a longitudinal section through a compressor for an internal combustion engine according to the invention with an associated trim controller in a position covering the inlet cross section of a compressor impeller as little as possible.
Figure 4:
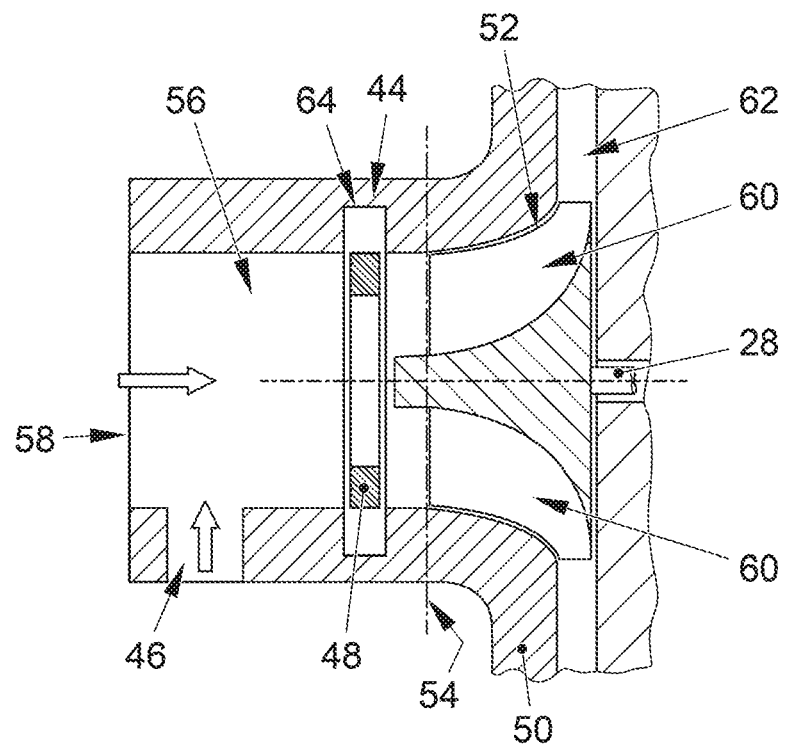
FIG. 4 illustrates the compressor according to FIG. 3 with the trim controller in a position covering the inlet cross section of the compressor impeller as much as possible.

In a longitudinal section, FIGS. 3 and 4 each show a possible embodiment for such a compressor 22. This compressor 22 may be provided, for example, for an internal combustion engine system 66 according to FIG. 2, wherein the trim controller 44 and a connection channel 46 for the exhaust gas recirculation line 36 are integral parts of the compressor 22. This is indicated in FIG. 2 by a dashed border.

The compressor 22 according to FIGS. 3 and 4 includes a housing 50, which may constitute a partial housing of an overall housing of an exhaust gas turbocharger. The housing 50 of the compressor 22 forms a flow space 52 within which the compressor impeller 30 is rotatably mounted. On the inlet side, the flow space 52 has an inlet cross section located in an inlet plane 54. Via an inlet channel 56 likewise formed by the housing 50 of the compressor 22, fresh gas can be guided from a compressor inlet 58 to the compressor impeller 30. On the outlet side, the flow space 52 is limited by an "outlet plane" surrounding outlet edges of impeller blades 60 of the compressor impeller 30. There, it is adjoined by a diffuser space 62 also surrounding the outlet edges of the impeller blades 60, and adjoining that, which is not shown in FIGS. 3 and 4, is a compressor volute. A compressor outlet branches off from the compressor volute.

Within the inlet channel 56, the trim controller 44 is arranged as closely as possible to the inlet cross section of the compressor impeller 30. The trim controller 44 includes an annular diaphragm 48 with a structure basically known from photo lenses. In a covering position according to FIG. 4, in a peripherally located annular area of the inlet cross section, the trim controller 44 mostly prevents an inflow of fresh gas flowing in the direction of the compressor impeller 30 to the compressor impeller 30. In this way, the trim controller 44 focuses this fresh gas flow on a hub-proximal portion of the compressor impeller 30. In a release position according to FIG. 3, however, the fresh gas can flow into the compressor impeller 30 over the entire inlet cross section. The diaphragm elements forming the 14s annular diaphragm 48, which are each pivotably mounted about an axis within the housing 50 for opening or closing the annular diaphragm 48, in the release position are arranged completely in an annular recess 64 of the housing 50.

Figure 5:
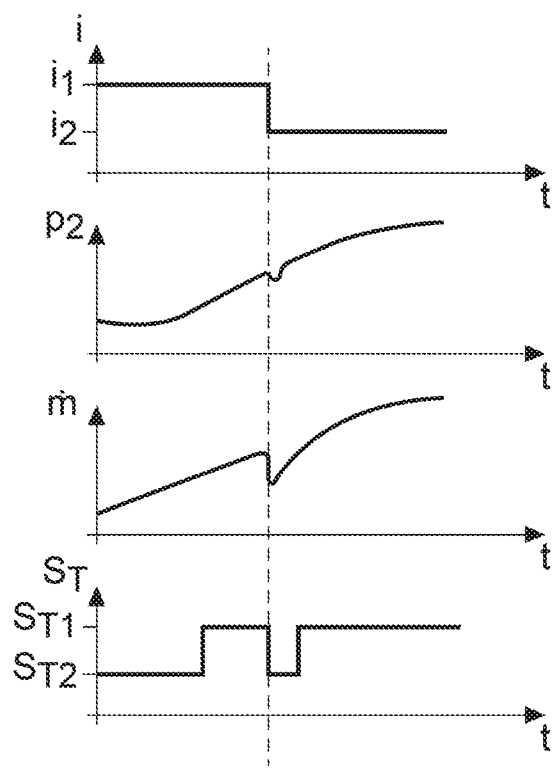
FIG. 5 illustrates in a total of four diagrams, the waveforms of various parameters during a first exemplary shifting operation during operation of a motor vehicle according to the invention.
Figure 6:
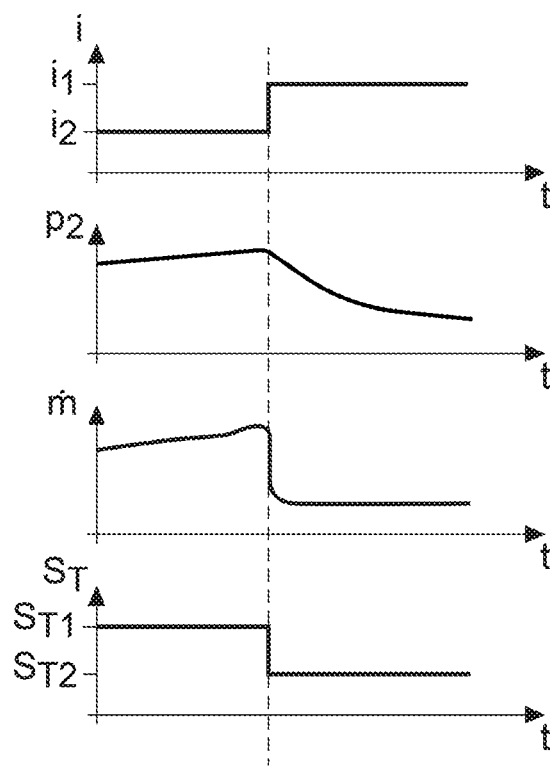
FIG. 6 illustrates in a total of four diagrams, the waveforms of various parameters during a second exemplary shifting operation during operation of a motor vehicle according to the invention.

According to the invention, it is provided that for a transition from a first operating state of the internal combustion engine system 66, in which the transmission 70 is in a first gear ratio shift position $i_1$ and the trim controller 44 is in the release position, to a second operating state of the internal combustion engine system 66, in which the transmission 70 is in a second gear ratio shift position $i_2$, the trim controller 44 is moved to the covering position. This is intended to prevent rattling due to recirculation of compressed fresh gas from the high pressure side of the compressor to the low pressure side, which would undulatingly propagate into the portion of the fresh gas line located upstream of the compressor impeller. FIGS. 5 and 6 clarify this approach based on four graphs, which show by way of example concurrent waveforms of different characteristics during a portion of the operation of the internal combustion engine system 66 involving a shifting operation.

In each case, the top diagram of FIGS. 5 and 6 shows the gear ratio i and thus the respectively applied gear ratio shift position $i_1$, $i_2$ of the transmission 70. The diagram right below and consequently, the upper of the two middle diagrams, shows the course of the boost pressure $p_2$ in the charge-air duct of the fresh gas line and thus downstream of the compressor 22, while the lower of the two middle diagrams represents the mass flow ṁ of the fresh gas guided through the compressor 22. Finally, each of the bottom diagrams of FIGS. 5 and 6 shows the opening degree $S_T$ of the trim controller 44, wherein the opening degree $S_{T1}$ corresponds to the release position in which the inlet cross section of the compressor impeller 30 is released as much as possible, and the opening degree $S_{T2}$ corresponds to the covering position in which said inlet cross section is released as little as possible.

The diagrams of FIG. 5 show an operation of the internal combustion engine system 66 during an acceleration process of a motor vehicle powered by the internal combustion engine system 66, in which initially in a relatively high gear ratio shift position $i_1$, for example during operation of the engine 10 under full load, acceleration takes place, and in the meantime, for achieving a higher drive power, a shift is made to a smaller gear ratio shift position $i_2$. This shifting operation leads to a temporary drop in the mass flow ṁ generally increasing during the given portion of the acceleration process while at the same time substantially steadily increasing the boost pressure $p_2$. This decrease in the mass flow m is due to the temporary reduction of the driving power for the compressor 22 through the exhaust gas turbine, which is caused by the load that is temporarily interrupted or reduced for the shifting operation during operation of the engine 10. During the shifting operation, there is thus a temporary, relatively high boost pressure $p_2$ and therefore a relatively high compressor pressure ratio over the compressor 22 with a simultaneously relatively low mass flow, resulting in a relevant recirculation of compressed fresh gas from the high pressure side to the low pressure side of the compressor 22, which can thus lead to the rattling noise. In order to avoid or to minimize such rattling, the trim controller 44, which in the part of the acceleration operation prior to the shifting operation has been moved from the covering position $S_{T2}$ to the release position $S_{T1}$ to ensure the operation of the compressor 22 that is optimal for the boost pressure, is temporarily moved back into the covering position $S_{T2}$. Thereby, the trim controller 44 blocks or minimizes the propagation of the recirculation of fresh gas, which takes place on the edge of the inlet cross section of the compressor impeller 30 and thus in the area covered by the trim controller 44 in the covering position $S_{T2}$, into the portion of the fresh gas line situated upstream of the trim controller 44, such that vibrational excitations which can lead to the rattling noise can be avoided or at least minimized. Since after the shifting operation, the acceleration operation is continued in the smaller gear ratio shift position $i_2$, the trim controller 44 is moved back to the release position to ensure an operation of the compressor 22 optimal for increasing the boost pressure.

The diagrams of FIG. 6 show an operation of the internal combustion engine system 66 during acceleration, for example, an operation of the engine 10 at full load at a relatively small gear ratio shift position $i_1$, which transitions into a shifting operation with a larger gear ratio shift position $i_2$. Subsequently, the internal combustion engine system 66 is operated substantially stationary in the plane for, for example, a constant travel of the motor vehicle driven by said engine. It can be seen that during the shifting operation, the mass flow ṁ drops significantly faster than the boost pressure $p_2$, so again there are conditions that favor a rattling noise. In order to avoid or minimize such a rattling noise, the trim controller 44, which during acceleration was set to the release position $S_{T1}$, is set to the covering position $S_{T2}$ for the shifting operation or during the shifting operation. Since no further acceleration of the motor vehicle is planned after shifting, in this exemplary embodiment the mass flow ṁ of the fresh gas flowing through the compressor is so low that with the simultaneously applied compressor pressure ratio, the operation of the compressor 22 with the trim controller 44 in the covering position $S_{T2}$ is more advantageous for the compressor efficiency, so that after the shifting operation, a return to the release position $S_{T1}$ it is not necessary. If after the shifting operation, further acceleration of the motor vehicle were planned, the trim collector 44 could again be moved to the covering position $S_{T2}$, as provided in the embodiment of FIG. 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a motor vehicle having an internal combustion engine system, the method comprising:
    operating an engine that is connectable by a rotary drive to wheels of the motor vehicle via a transmission;
    compressing fresh gas via a compressor being integrated in a fresh gas line,
        wherein the compressor is associated with a trim controller, and via the trim controller, an edge-side portion of an inlet cross section of a compressor impeller of the compressor is covered to a variable extent; and
        wherein in a release position of the trim controller, the edge-side portion of the inlet cross section is covered to a lesser extent than when the trim controller is in a covering position; and
    adjusting the trim controller from the release position to the covering position, via an engine control unit, when the engine transitions from a first operating state in which the transmission is in a first gear ratio shift position to a second operating state in which the transmission is in a second gear ratio shift position.

2. The method according to claim 1, wherein said adjusting the trim controller from the release position to the covering position further includes:
    uncovering the edge-side portion of the inlet cross section in the release position; and
    uncovering the edge-side portion of the inlet cross in the covering position.

3. The method according to claim 1, further comprising at least one of:
    adjusting the trim controller from the covering position to the release position when the engine is operated in the second operating state with a load beyond a defined limit; and
    maintaining the trim controller in the covering position when the engine is operated in the second operating state with at most one load corresponding to the defined limit.

4. The method according to claim 3, further comprising resetting the trim controller to the release position when a value of a mass flow of the fresh gas through the compressor corresponds to a value immediately prior to the transition and/or the value of the mass flow is at a defined distance from a surge line of the compressor.

5. A motor vehicle comprising:
    an internal combustion engine system including:
        an engine, which is connected by a rotary drive via a transmission with wheels of the motor vehicle;
        a fresh gas line;
        a compressor integrated in the fresh gas line;
        a trim controller associated with the compressor,
            wherein via the trim controller, an edge-side portion of an inlet cross section of a compressor impeller of the compressor is covered to a varying extent; and
            wherein in a release position of the trim controller, the edge-side portion of the inlet cross section is covered to a lesser extent than when the trim controller in a covering position; and
        a control device configured for an automated execution of:
            operating the engine that is connected by the rotary drive via the transmission with the wheels of the motor vehicle;
            compressing fresh gas via the compressor integrated in the fresh gas line; and
            adjusting the trim controller from the release position to the covering position when the engine transitions from a first operating state in which the transmission is in a first gear ratio shift position to a second operating state in which the transmission is in a second gear ratio shift position.

6. The motor vehicle according to claim 5, wherein the trim controller comprises an annular diaphragm.

* * * * *